United States Patent [19]
McLaughlin

[11] Patent Number: 5,735,929
[45] Date of Patent: Apr. 7, 1998

[54] HIGH SOLUBILITY $K_2SO/KNO_4$ CONPOSITIONS

[75] Inventor: J. C. McLaughlin, Brigham City, Utah

[73] Assignee: Great Salt Lake Minerals Corporation, Overland Park, Kans.

[21] Appl. No.: 726,929

[22] Filed: Oct. 8, 1996

Related U.S. Application Data

[63] Continuation of Ser. No. 310,497, Sep. 22, 1994, abandoned.

[51] Int. Cl.[6] .................... C01D 5/00; C05D 1/00; C05D 1/02
[52] U.S. Cl. .................. 71/63; 71/64.1; 423/274; 423/551
[58] Field of Search ............ 71/63, 64.1; 423/274, 423/551

[56] References Cited

U.S. PATENT DOCUMENTS 5,298,050   3/1994   McLaughlin et al. .................. 71/63

FOREIGN PATENT DOCUMENTS

| | | |
|---|---|---|
| 1057072 | 5/1959 | Germany . |
| 4336461 | 11/1982 | Germany . |
| 59-105417 | 5/1984 | Japan . |
| 827392 | 5/1981 | U.S.S.R. . |

*Primary Examiner*—Ferris Lander
*Attorney, Agent, or Firm*—Hovey, Williams, Timmons & Collins

[57] ABSTRACT

Improved potassium sulfate/potassium nitrate salt products in both solid particulate and liquid form are provided which exhibit enhanced salt solubility in water. The products include potassium nitrate and potassium sulfate, in combination with a surfactant and mixed together in water. The aqueous mixture is heated to a maximum reaction temperature in the range of about 100–°210° F., and will retain enhanced water solubility in either a heated or cooled condition.

27 Claims, 2 Drawing Sheets

HIGH SOLUBILITY K₂SO/KNO₄ COMPOSITIONS

This application is a continuation of application Ser. No. 08/310,487, filed Sep. 22, 1994 and now abandoned.

BACKGROUND OF THE INVENTION

1. Field of the Invention

The present invention is broadly concerned with improved potassium sulfate/potassium nitrate salt products having enhanced water solubility permitting them to be used with greater efficiency as liquid, spray-on fertilizer products. More particularly, it is concerned with such improved potassium products, as well as a method of producing the same, wherein treated potassium sulfate and potassium nitrate (a surfactant may optionally be added) are mixed with water and subjected to heating to a temperature of 100°–210° F.; the solution, when cooled, exhibits a significantly increased potassium solubility (measured in terms of $K_2O$ solubility), as compared with either untreated potassium sulfate or potassium nitrate solutions individually.

2. Background

Potassium sulfate ($K_2SO_4$), potassium chloride (KCl) and potassium nitrate ($KNO_3$) are all used as fertilizer products to a greater or lesser degree. Potassium chloride is the most widely used potassium salt, but is inapplicable for chloride and/or salt-sensitive crops such as tobacco, fruits, vegetables and turfs. However, KCl has a significant water solubility on the order of 14–16% (measured as $K_2O$), and therefore this salt is often applied as a liquid.

Potassium sulfate (commonly referred to in the trade as sulfate of potash or SOP) is a premium fertilizer product. Certain grades of SOP, particularly those manufactured from the brine of the Great Salt Lake, are especially valuable products because they are essentially free of chlorides. Therefore, such products are admirably suited for use on chloride and/or salt-sensitive crops and the like. A drawback of SOP, however, is that in its natural state it is significantly less soluble in water than KCl, having an ambient temperature solubility of about 4–6 wt % as $K_2O$. This relatively low water solubility has inhibited the use of $K_2SO_4$ as a liquid fertilizer product, despite its otherwise significant advantages.

Potassium nitrate is more soluble than SOP, normally about 9–11 wt % as $K_2O$, but is a very expensive product as compared with KCl or $K_2SO_4$. Nevertheless, it has achieved some commercial utility as a liquid fertilizer source, owing at least in part to its low salt index.

The water solubility of potassium sulfate salt products may be enhanced to ≧8% (as $K_2O$) by use of the method taught in U.S. Pat. No. 5,298,050 (the teachings of which are incorporated herein by reference), wherein potassium sulfate is mixed with water and an appropriate surfactant and optional defoamer, hereinafter referred to as "enhanced soluble potash" (hereinafter referred to as or "ESP").

It will of course be appreciated that the further enhancement of the solubility of potassium sulfate salts would represent a significant advance. Such an improvement would mean that more concentrated solutions could be prepared and applied, thereby lessening preparation, storage and transportation costs associated with the liquids.

SUMMARY OF THE INVENTION

The present invention overcomes the problems outlined above, and provides improved potassium sulfate products (both solids and liquids) which exhibit materially improved water solubilities. The invention is predicated upon the discovery that improved aqueous compositions having enhanced potassium solubilities can be formulated through the use of a mixture of ESP with potassium nitrate in water. In particular, the improved composition of the instant invention exhibits significantly increased potassium solubility, as compared to either untreated potassium sulfate or potassium nitrate solutions, individually or in combination.

As described in U.S. Pat. No. 5,298,050, ESP broadly includes potassium sulfate products supplemented with an appropriate surfactant and optional defoamer. In preparative procedures, the potassium sulfate and surfactant are present in water solution, which solution is heated to a temperature in the range of 100° to 210° F. ESP may also be formulated by means of particulate potassium sulfate with a surfactant and optional defoamer applied onto the surface thereof. As disclosed in the '050 patent, the surfactant is present at a level of at least about 0.1 wt %, or preferably at least 0.25 wt %, and most preferably from about 0.30–0.50 wt %, based upon the weight of the nominally dry potassium sulfate.

The preferred surfactants for use in the instant invention, and as described in the '050 patent, are selected from the group consisting of the disulfonate and oxyalkylated alcohol-carboxylic acid adduct surfactants. In former class, the alkly diphenyl ether disulfonates are preferred, wherein the alkly group contains from about 8–22 carbon atoms, and more particularly from about 10–18 carbon atoms, moreover, the alkyl group of the disulfonate is preferably linear. The second class of preferred surfactants are those selected from the group consisting of surfactants having the general formula:

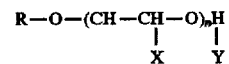

wherein R is a $C_8$–$C_{22}$ hydrophobe, X and Y are individually selected from the group consisting of $CH_3$ and a succinic acid radical, and n ranges from about 1–8. Particularly preferred are the succinic acid derivatives wherein the hydrophobe has a carbon number of from about 9–16.

As yet further disclosed in the '050 patent, in a further aspect of ESP, aqueous potassium sulfate solutions are provided which comprise water, dissolved potassium sulfate and a surfactant of the type and in the amounts described previously; a defoamer may also optionally be used.

The method of increasing potassium solubility in the present invention comprises the steps of mixing together quantities of water, potassium sulfate, a surfactant and optional defoamer of the types and the amounts specified in connection with the particular products, and potassium nitrate.

The mixture is then heated to a reaction temperature of 100°–210° F., preferably with agitation or stirring. In this respect, it has been found that increasing the reaction temperature has a positive effect upon solubility. However, for overall reasons of ease of processing and handling, and fuel economy, it is believed that a solution having ≧14% potassium solubility (measured as $K_2O$) is commercially feasible. These types of solutions can readily be produced using a maximum reaction temperature on the order of 100°–140° F.

After the maximum reaction temperature is achieved, it may be held at this maximum temperature for a short time (e.g., 5 minutes) whereupon the solution is allowed to cool, again with at least occasional agitation or stirring, to approximately room temperature (i.e., 68°–75° F.).

The ESP and potassium nitrate reagents can be individually stored and shipped to a remote location in proximity to a point of use. Thereupon, the ESP/potassium nitrate reagents can be dissolved in hot water, or placed in cold water and heated to a minimum reaction temperature and cooled to about ambient. This liquid is then eminently suited for spray application onto a crop or turf grass, or direct application to the soil. The dissolved salt content as $K_2O$ will not significantly decrease over time, and little or no salting out or precipitation should occur.

To give a specific example, a 100 pound sample of $K_2SO_4$ can be sprayed with 0.5 wt % of a preferred disulfonate surfactant, which will adequately adhere to the $K_2SO_4$ without drying or other steps. This amount of ESP can then be dissolved with 233 pounds of potassium nitrate in 90 gallons of water and heated to a temperature of 110°–120° F. The product will then have a minimum of 14% solubility as $K_2O$, with a surfactant content on the order of 460 ppm.

DETAILED DESCRIPTION OF THE PREFERRED EMBODIMENTS

Figure 1:
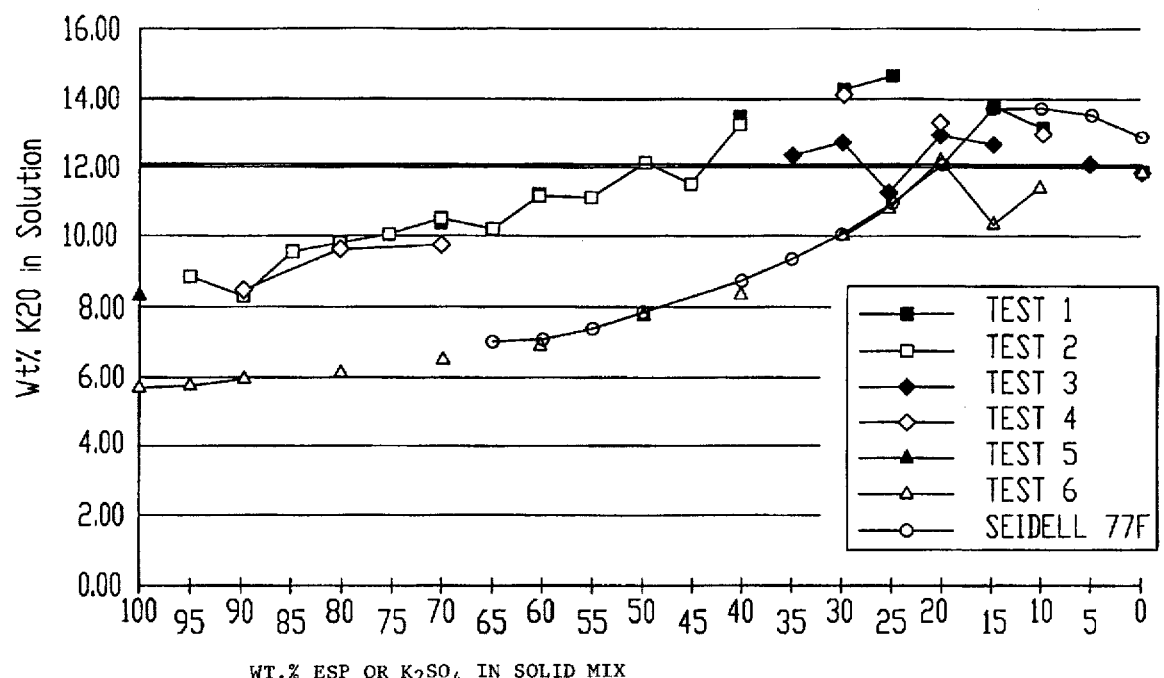
FIG. 1 is a graphical representation illustrating comparative tests with $KNO_3$ and $K_2SO_4$ at ambient temperature (about 71°–74° F.), and showing the effect of formulating a solution with $KNO_3$ and $K_2SO_4$ treated with surfactant, followed by heating.

The following examples are illustrative of the present invention. It should be understood, however, that these examples are to be taken by way of illustration only and nothing therein should be considered as a limitation upon the overall scope of the invention.

As indicated above, one preferred class of surfactants for use in the present invention is the disulfonates, and particularly the alkyl diphenyl ether disulfonates. Two particular products which have been found to be useful are the Poly-Tergent 2A1-L anionic surfactant and the Poly-Tergent 3B2 anionic surfactant, both of which are commercialized by Olin Chemicals of Stamford, Conn.

The 2A1-L surfactant is a linear dodecyl diphenyl ether sodium disulfonate, having a freezing point of 32° F., a boiling of 212° F., a specific gravity of 1.16, a bulk density of 9.15 lb/gal., a pH at 25° C. of greater than 9, and a vapor pressure at 25° C. of 23.7 mm Hg. This product is further defined in an Olin Product Data Sheet entitled "Poly-Tergent 2A1 Acid and Poly-Tergent 2A1 Artionic Surfactant", and the associated Material Safety Data Sheets, all of which are incorporated by reference herein.

The Poly-Tergent 3B2 anionic surfactant is a decyl diphenyl ether sodium disulfonate having essentially the same physical properties as the 2A1-L surfactant. The 3B2 surfactant is described in an Olin Product Data Sheet entitled "Poly-Tergent 3B2 Acid and Poly-Tergent 3B2 Artionic Surfactant", and the associated Material Safety Data Sheets; these publications are incorporated by reference herein.

Another disulfonate of interest is the Poly-Tergent 4C3 anionic surfactant commercialized by Olin Chemical. This is the sodium salt of hexadecyl diphenyl ether disulfonic acid. Its physical data vary slightly as compared with the 2A1-L and 3B2 surfactants. This product is described in an Olin Product Data Sheet entitled "Poly-Tergent 4C3 Artionic Surfactant" and the related Material Safety Data Sheets, and these materials are incorporated by reference herein.

One type of the oxyalkylated alcohol-carboxylic acid adduct surfactants preferred for use in the invention is the Poly-Tergent C-series surfactants commercialized by Olin Chemical. This series is a family of 9 polycarboxylated surfactants having the formula described previously. Particularly preferred members of this class are the succinic acid derivative products, with hydrophobes having an average carbon length ranging from $C_9$–$C_{16}$. This class of surfactants is described in an Olin Product Data Sheet entitled "Poly-Tergent C-Series Polycarboxylated Multifunctional Surfactants", and the related Material Safety Data Sheets, all of which are incorporated by reference herein.

In some instances, it may be advisable to add a very minor amount of a defoamer to the potassium sulfate salt products of the invention, in order to minimize foaming during heating and stirring. One suitable defoamer is a product commercialized under the name "Foam Ban Co" by Ultra Additives, Inc. of Patterson, N.J. This proprietary product contains polyalkylene glycol as well as an oxyalkylene polymer, and is known to be useful as an anti-foam/defoamer agent.

The potassium sulfate and potassium nitrate of the invention can be derived from virtually any commercial source. However, the use of the Soluble Fine grade of potassium sulfate sold by Great Salt Lake Mineral Corporation is particularly preferred. This material is in itself a premium product which is free of KCl. Therefore, this $K_2SO_4$ is especially suited for applications where significant chloride ion presence cannot be tolerated.

In all the examples discussed below, ingredients were weighed into a 600 ml beaker equipped with a magnetic stirring bar. The mixtures of liquid and solid were then brought up to the temperature indicated while stirring. The resulting solutions were then placed into a constant temperature bath and then cooled. Each sample was allowed sufficient time to reach equilibrium temperature and to allow crystallization to occur. Each beaker was also stirred periodically to break any supersaturation.

Example 1

In this series of tests, samples of reagent grade $K_2SO_4$ and $KNO_3$ were treated with the surfactant Poly-Tergent 3B2 and a magnesium compound to determine the resulting enhancement of potassium solubility. In each test, water containing 0.16 wt % 3B2 surfactant and 2.13 wt % MgSO4 was added to solid $K_2SO_4$ to form ESP with a constant Mg and surfactant content. Solid $KNO_3$ was added to the mixture and the mixture was then heated to 160° F. and allowed to cool to ambient temperature. Each test sample was then filtered and the clear solution analyzed for salt and ingredient content. Table 1 sets forth the results of these test runs.

TABLE 1

(Solid ESP and $KNO_3$ with Water and with Added Surfactant 3B2 and Mg Ion to Maintain Constant Higher Levels of Mg and Surfactant)

| Sample # | Starting Weights[1] | | | Solid Mix % ESP | Temp Deg F. | Analyzed $K_2O^3$ | Weight percent in Solution | | | | Surfactant ppm |
|---|---|---|---|---|---|---|---|---|---|---|---|
| | Liquid | $K_2SO_4$ | $KNO_3$ | | | | Mg | $SO_4$ | $NO_3$*[4] | $H_2O$*[5] | |
| 561 | 287 | | 135 | | 74 | 12.23 | 0.32 | 1.54 | 15.7 | 72.3 | 1088 |
| 562 | 340 | 16 | 144 | 10 | 74 | 12.99 | 0.29 | 3.42 | 14.2 | 71.4 | 1088 |
| 563 | 340 | 24 | 136 | 15 | 74 | 13.56 | 0.32 | 4.25 | 14.0 | 70.2 | 1088 |
| 565 | 340 | 40 | 120 | 25 | 74 | 15.02 | 0.33 | 5.02 | 15.0 | 67.2 | 1088 |
| 566 | 340 | 48 | 112 | 30 | 74 | 14.59 | 0.31 | 5.04 | 14.3 | 68.3 | 1088 |
| 567 | 340 | 64 | 96 | 40 | 74 | 13.88 | 0.34 | 5.48 | 12.9 | 69.7 | 1088 |
| 569 | 340 | 96 | 64 | 60 | 74 | 11.47 | 0.35 | 5.93 | 9.2 | 75.0 | 1088 |
| 5610 | 340 | 112 | 48 | 70 | 74 | 10.43 | 0.36 | 6.41 | 7.3 | 77.3 | 1088 |

[1]Weights are in grams
[2]Weight percent of solid ESP in the solids used (ESP + $KNO_3$)
[3]$K_2O$ is a calculated value determined by the equation $K_2O = (\% K) \times (1.2046)$
[4]The $NO_3$ content was calculated from the molecular balance after analyzing for the other ions.
[5]The water weight percent was calculated as the difference between 100% and the sum of the ions in weight percent.
*Calculated The data appearing in Table 1 demonstrates the significant increase in potassium solubility derived from the addition of ESP, potassium nitrate and water, and heating in accordance with the present invention. The advantageous results are particularly evident where the initial weight ratio of ESP (measured as wt % $K_2SO_4$) to $KNO_3$ is 30% (at which level potassium concentration is 14.59 (measured as $K_2O$). This value far exceeds the theoretical potassium concentration which can be achieved if only potassium sulfate and potassium nitrate are mixed in water at the same initial weight ratio of 30%. For 30% $K_2SO_4$/70% $KNO_3$, the theoretical $K_2O$ content is calculated as follows:

$[K_2O]$=(wt % $K_2SO_4$)[$K_2O$ from 100 wt % $K_2SO_4$ Theo]+ (wt % $KNO_3$)[$K_2O$ from 100 wt % $KNO_3$ Theo]

where:
wt % $K_2SO_4$=30%
$K_2O$ from 100 wt % $K_2SO_4$ at 71° F.=5.57 wt % $KNO_3$=70%
$K_2O$ from 100 wt % $KNO_3$ at 71° C.=11.77 $[K_2O]$=(0.30)(5.57)+(0.07)(11.77)=9.91

The following Table 2 sets forth $K_2O$ values for various ESP/$KNO_3$/water systems, as well as giving the known solubilities for potassium nitrate and potassium sulfate.

TABLE 2

ESP-KNO3-Water Systems

| Start # | Solids** | Weight % $K_2O$ in Solution at Temperature | | | | | Surfactant (ppm) |
|---|---|---|---|---|---|---|---|
| | | 71 F. | 60 F. | 50 F. | 40 F. | 30 F. | |
| 55 | 30% ESP[1] | 14.18 | 11.93 | 10.56 | 9.36 | 6.69 | 460 |
| 54 | 70% ESP | 9.71 | 9.65 | 8.65 | 7.79 | 7.17 | 750 |
| Theo | 100% $KNO_3^2$ | 11.77 | 9.76 | 8.05 | 6.43 | 5.29 | 0 |
| 71 | 100% ESP | 8.55 | 7.84 | 6.78 | 6.20 | 5.12 | 967 |
| Theo | 100% $K_2SO_4^3$ | 5.57 | 5.03 | 4.59 | 4.16 | 3.62 | 0 |

**Mixtures are ESP with $KNO_3$
[1]ESP was prepared according to Example 3, Table 5 in U.S. Pat. No. 5,298,050 (GSL Production ESP (Sprayed $K_2SO_4$))
[2,3]The theoretical $KNO_3$ and $K_2SO_4$ concentrations were from Lange's Handbook of Chemistry (McGraw-Hill Publishing) and Seidell Solubility Tables (American Chemical Society, 1965)

Contrasting the theoretical potassium concentration calculated above (i.e., $[K_2O]$=9.91) with the actual potassium concentration achieved when practicing the invention as taught by Example 1 (i.e., $[K_2O]$ actual=14.59, 74° F., 30 wt % ESP), it can be appreciated that there is a significant increase in potassium concentration as a result of the composition of the instant invention.

Example 2

In this test, a number of runs were carried out to determine the effect of allowing the Mg content to decrease while the surfactant level in the composition was maintained having 500 ppm in one series and a constant 1000 ppm in another series. The major objective was to obtain additional cooling data between 5–95% ESP in the solid mix, and to determine whether the Mg and surfactant levels needed to be maintained. In each test, water containing 0.03 wt % 3B2 surfactant was added to solid ESP (obtained from Great Salt Lakes Minerals Production, Ogden, Utah) to form adjusted ESP and maintain the surfactant level above 500 ppm and at a constant 1000 ppm in the solution. Solid $KNO_3$ was then added and the mixture heated to 160° F. and allowed to cool to ambient temperature. Each sample was then filtered and the clear solution analyzed. Each solution was then progressively cooled and sampled. Tables 3 and 4 set forth the results of these test runs.

The data presented in Table 3 and 4 also demonstrate the significant increase in potassium solubility derived from the addition of $KNO_3$ ($[K_2]$=13.44, 40 wt % ESP, 72° F.) even where [$MgSO_4$] is reduced in the composition and surfactant level below those in Example 1.

TABLE 3

(Solid Protection ESP With $KNO_3$ and Water with Surfactant 3B2 Added to Assure the PPM Level was above 500)

| | Starting Weights[1] | | | Solid Mix | Temp | Weight percent in Solution | | | | | | Surfactant |
|---|---|---|---|---|---|---|---|---|---|---|---|---|
| # | Liquid | ESP | $KNO_3$ | % ESP[2] | Deg F. | $K_2O$[3] | Mg | Cl | $SO_4$ | $NO_3$*[4] | $H_2O$*[5] | ppm |
| 21 | 410 | 81 | 9 | 90 | 72 | 8.50 | 0.16 | 0.48 | | | | 812 |
| 22 | 402 | 78 | 20 | 80 | 72 | 9.81 | 0.18 | 0.46 | | | | 783 |
| 23 | 392 | 75 | 32 | 70 | 72 | 10.60 | 0.16 | 0.49 | | | | 754 |
| 24 | 380 | 72 | 48 | 60 | 72 | 11.36 | 0.16 | 0.45 | | | | 718 |
| 25 | 368 | 66 | 66 | 50 | 72 | 12.36 | 0.15 | 0.45 | | | | 659 |
| 26 | 354 | 58 | 88 | 40 | 72 | 13.44 | 0.13 | 0.41 | | | | 585 |
| 271 | 413 | 83 | 4 | 95 | 74 | 8.97 | 0.19 | 0.54 | 8.64 | 0.7 | 82.5 | 826 |
| 281 | 406 | 80 | 14 | 85 | 74 | 9.59 | 0.17 | 0.53 | 8.37 | 1.8 | 81.2 | 795 |
| 291 | 397 | 77 | 26 | 75 | 74 | 10.13 | 0.18 | 0.43 | 8.07 | 3.1 | 79.8 | 775 |
| 2101 | 387 | 74 | 40 | 65 | 74 | 10.34 | 0.18 | 0.44 | 7.36 | 4.3 | 79.2 | 736 |
| 2111 | 375 | 69 | 56 | 55 | 74 | 11.30 | 0.16 | 0.44 | 6.72 | 6.2 | 77.1 | 689 |
| 2121 | 362 | 62 | 76 | 45 | 74 | 11.70 | 0.14 | 0.38 | 5.80 | 8.0 | 76.0 | 623 |
| | | | | % ESP | | | | | | | | |
| 212 | Cooled #'s 21–2121 | | | 90 | 50 | 7.16 | 0.18 | 0.45 | 7.07 | 0.4 | 85.9 | 812 |
| 222 | | | | 80 | 50 | 8.54 | 0.19 | 0.44 | 6.94 | 2.5 | 82.9 | 783 |
| 232 | | | | 70 | 50 | 9.00 | 0.18 | 0.49 | 6.65 | 3.3 | 81.9 | 754 |
| 242 | | | | 60 | 50 | 10.46 | 0.16 | 0.42 | 6.16 | 5.9 | 78.7 | 718 |
| 252 | | | | 50 | 50 | 11.46 | 0.15 | 0.40 | 5.75 | 7.7 | 76.5 | 659 |
| 262 | | | | 40 | 50 | 10.66 | 0.14 | 0.38 | 5.51 | 7.0 | 78.2 | 585 |
| 273 | | | | 95 | 50 | 7.00 | 0.21 | 0.51 | 7.30 | –0.0 | 86.2 | 826 |
| 283 | | | | 85 | 50 | 8.01 | 0.20 | 0.48 | 7.14 | 1.5 | 84.0 | 795 |
| 293 | | | | 75 | 50 | 8.75 | 0.21 | 0.45 | 6.93 | 2.9 | 82.3 | 775 |
| 2103 | | | | 65 | 50 | 9.58 | 0.19 | 0.42 | 6.78 | 4.1 | 80.6 | 736 |
| 2113 | | | | 55 | 50 | 11.12 | 0.18 | 0.48 | 6.35 | 6.5 | 77.2 | 689 |
| 2123 | | | | 45 | 50 | 10.84 | 0.16 | 0.36 | 5.83 | 6.9 | 77.7 | 623 |

*Calculated
[1]Weights are in grams
[2]Weight percent of solid ESP in the solids used (ESP + $KNO_3$)
[3]$K_2O$ is a calculated value determined by the equation $K_2O = (\% K) \times (1.2046)$
[4]The $NO_3$ content was calculated from the molecular balance after analyzing for the other ions.
[5]The water weight percent was calculated as the difference between 100% and the sum of the ions in weight percent

TABLE 4

(Solid Production ESP With $KNO_3$ and Water with Surfactant 3B2 Added for a Constant PPM Level)

| | Starting Weights[1] | | | Solid Mix | Temp | Weight percent in Solution | | | | | | Surfactant |
|---|---|---|---|---|---|---|---|---|---|---|---|---|
| # | Liquid | ESP | $KNO_3$ | % ESP[2] | Deg F. | $K_2O$[3] | Mg | Cl | $SO_4$ | $NO_3$*[4] | $H_2O$*[5] | ppm |
| 313 | 349 | 53 | 98 | 35 | 73 | 12.62 | 0.13 | 0.37 | 4.86 | 10.4 | 73.8 | 1000 |
| 314 | 346 | 46 | 108 | 30 | 73 | 12.99 | 0.11 | 0.34 | 4.53 | 11.2 | 73.0 | 1000 |
| 315 | 341 | 40 | 119 | 25 | 73 | 11.40 | 0.11 | 0.30 | 4.25 | 9.6 | 76.3 | 1000 |
| 316 | 348 | 30 | 122 | 20 | 73 | 13.08 | 0.07 | 0.25 | 3.57 | 12.5 | 72.7 | 1000 |
| 317 | 355 | 22 | 123 | 15 | 73 | 12.59 | 0.05 | 0.18 | 2.66 | 13.1 | 73.6 | 1000 |
| 318 | 366 | 7 | 127 | 5 | 73 | 12.12 | 0.06 | 0.19 | 1.41 | 14.1 | 74.2 | 1000 |
| | | | | % ESP | | | | | | | | |
| 3132 | Cooled #'s 313–318 | | | 35 | 50 | 10.42 | 0.13 | 0.31 | 5.07 | 7.3 | 78.5 | 1000 |
| 3142 | | | | 30 | 50 | 10.41 | 0.15 | 0.31 | 4.87 | 7.6 | 78.4 | 1000 |
| 3152 | | | | 25 | 50 | 10.31 | 0.17 | 0.32 | 4.68 | 7.8 | 78.4 | 1000 |
| 3162 | | | | 20 | 50 | 9.95 | 0.11 | 0.25 | 3.85 | 8.3 | 79.3 | 1000 |
| 3172 | | | | 15 | 50 | 9.40 | 0.08 | 0.21 | 2.94 | 8.6 | 80.4 | 1000 |
| 3182 | | | | 5 | 50 | 8.31 | 0.08 | 0.20 | 1.15 | 9.5 | 82.2 | 1000 |

*Calculated
[1]Weights are in grams
[2]Weight percent of solid ESP in the solids used (ESP + $KNO_3$)
[3]$K_2O$ is a calculated value determined by the equation $K_2O = (\% K) \times (1.2046)$
[4]The $NO_3$ content was calculated from the molecular balance after analyzing for the other ions.
[5]The water weight percent was calculated as the difference between 100% and the sum of the ions in weight percent

Example 3

In this example, a number of runs were carried out to determine the effect of using non-adjusted ESP in formulating composition. In each test, water was added to solid ESP (obtained from Great Salt Lake Minerals Production). Solid $KNO_3$ was then added to the mixture, and the mixture was heated to 160° F. and allowed to cool to ambient temperature. Each sample was then filtered and the clear solution was analyzed. Each sample was then progressively cooled and further analyzed. Table 5 sets forth the results of these test runs.

TABLE 5

(Solid Production ESP with KNO₃ and Water, No Other Additives)

| # | Starting Weights[1] | | | Solid Mix % ESP[2] | Temp Deg F. | Weight percent in Solution | | | | | | Surfactant ppm |
|---|---|---|---|---|---|---|---|---|---|---|---|---|
| | H2O | ESP | KNO₃ | | | $K_2O$[3] | Mg | Cl | $SO_4$ | $NO_3$*[4] | $H_2O$*[5] | |
| 52 | 410 | 81 | 9 | 90 | 71 | 8.75 | 0.20 | 0.44 | 8.40 | 0.9 | 82.8 | 810 |
| 53 | 402 | 78 | 20 | 80 | 71 | 9.55 | 0.18 | 0.44 | 8.14 | 2.2 | 81.1 | 780 |
| 54 | 393 | 75 | 32 | 70 | 71 | 9.71 | 0.20 | 0.41 | 7.32 | 3.6 | 80.4 | 750 |
| 55 | 346 | 46 | 108 | 30 | 71 | 14.18 | 0.13 | 0.28 | 4.63 | 12.9 | 70.3 | 460 |
| 56 | 348 | 30 | 122 | 20 | 71 | 13.49 | 0.10 | 0.23 | 3.98 | 12.7 | 71.8 | 300 |
| 57 | 361 | 14 | 125 | 10 | 71 | 12.80 | 0.03 | 0.18 | 1.55 | 14.7 | 72.9 | 140 |
| | | | | % ESP | | | | | | | | |
| 522 | Cooled #'s 52–57 | | | 90 | 50 | 6.99 | 0.19 | 0.48 | 6.46 | 1.0 | 86.1 | 810 |
| 532 | | | | 80 | 50 | 7.63 | 0.19 | 0.45 | 6.44 | 1.9 | 84.7 | 780 |
| 542 | | | | 70 | 50 | 8.65 | 0.18 | 0.44 | 6.17 | 3.6 | 82.5 | 750 |
| 552 | | | | 30 | 50 | 10.56 | 0.12 | 0.36 | 4.61 | 7.9 | 78.2 | 460 |
| 562 | | | | 20 | 50 | 9.84 | 0.07 | 0.32 | 3.51 | 8.2 | 79.7 | 300 |
| 572 | | | | 10 | 50 | 8.78 | 0.09 | 0.20 | 1.79 | 9.4 | 81.3 | 140 |

*Calculated
[1]Weights are in grams
[2]Weight percent of solid ESP in the solids used (ESP + KNO₃)
[3]$K_2O$ is a calculated value determined by the equation $K_2O$ = (% K) × (1.2046)
[4]The $NO_3$ content was calculated from the molecular balance after analyzing for the other ions.
[5]The water weight percent was calculated as the difference between 100% and the sum of the ions in weight percent The data in Table 5 demonstrate that a composition can be advantageously prepared without adjusting the composition of the ESP, under which conditions the potassium concentration is significantly higher than theoretical ([$K_2O$] actual= 14.18, 30 wt % ESP, 71° C. compared to [$K_2O$] theoretical= 9.91 (as calculated above)).

Example 4

In this example, a number of runs were carried out to determine the effect of using $K_2SO_4$ rather than ESP. In each test, water was added to reagent grade. $K_2SO_4$ meeting American Chemical Society specifications for reagent grade (obtained from Fisher Scientific Company). Solid $KNO_3$ was then added and the mixture heated to 160° F. The mixture was then allowed to cool to ambient temperature. Each sample was next filtered and the clear solution was then analyzed. Each solution was then progressively cooled and thereafter analyzed at the cooler temperature. The data in Table 6 sets forth the results of these test runs.

TABLE 6

(Reagent Grade $K_2SO_4$, $KNO_3$ and $H_2O$, No Other Additives)

| # | Starting Weights[1] | | | Solid Mix % K2SO4[2] | Temp Deg F. | Weight percent in Solution | | | |
|---|---|---|---|---|---|---|---|---|---|
| | H2O | $K_2SO_4$ | $KNO_3$ | | | $K_2O$[3] | $SO_4$ | $NO_3$*[4] | $H_2O$*[5] |
| 91 | 356 | 14 | 130 | 10 | 73 | 11.56 | 1.84 | 12.8 | 75.7 |
| 92 | 375 | 25 | 100 | 20 | 73 | 12.36 | 2.80 | 12.7 | 74.3 |
| 93 | 398 | 31 | 71 | 30 | 73 | 9.97 | 3.43 | 8.7 | 79.6 |
| 94 | 422 | 39 | 39 | 50 | 73 | 7.76 | 4.31 | 4.6 | 84.6 |
| 95 | 434 | 46 | 20 | 70 | 73 | 6.66 | 4.82 | 2.5 | 87.1 |
| 96 | 441 | 53 | 6 | 90 | 73 | 5.95 | 4.94 | 1.5 | 88.7 |
| 971 | 355 | 22 | 123 | 15 | 73 | 10.53 | 2.97 | 10.0 | 78.3 |
| 981 | 389 | 28 | 84 | 25 | 73 | 10.85 | 2.97 | 10.5 | 77.6 |
| 991 | 412 | 36 | 54 | 40 | 73 | 8.65 | 3.67 | 6.6 | 82.5 |
| 9101 | 430 | 42 | 28 | 60 | 73 | 6.97 | 4.58 | 3.3 | 86.4 |
| 9111 | 437 | 51 | 13 | 80 | 73 | 6.32 | 5.13 | 1.7 | 87.9 |
| 9121 | 443 | 55 | 3 | 95 | 73 | 5.64 | 5.30 | 0.6 | 89.4 |
| | | | | % K2SO4 | | | | | |
| 912 | Cooled #'s 91–9121 | | | 10 | 50 | 8.79 | 1.86 | 9.2 | 81.7 |
| 922 | | | | 20 | 50 | 9.25 | 2.51 | 8.9 | 80.9 |
| 932 | | | | 30 | 50 | 8.43 | Lost | | |
| 942 | | | | 50 | 0 | 6.50 | Lost | | |
| 952 | | | | 70 | 50 | 5.52 | 3.66 | 2.5 | 89.2 |
| 962 | | | | 90 | 50 | 4.65 | 4.13 | 0.8 | 91.2 |
| 973 | | | | 15 | 50 | 9.76 | 2.93 | 9.1 | 79.9 |
| 983 | | | | 25 | 50 | 9.29 | 2.73 | 8.7 | 80.9 |
| 993 | | | | 40 | 50 | 8.00 | 3.09 | 6.5 | 83.7 |
| 9103 | | | | 60 | 50 | 6.06 | 3.50 | 3.5 | 88.0 |

TABLE 6-continued (Reagent Grade K₂SO₄, KNO₃ and H₂O, No Other Additives)

| | Starting Weights[1] | | | Solid Mix | Temp | Weight percent in Solution | | | |
|---|---|---|---|---|---|---|---|---|---|
| # | H2O | K₂SO₄ | KNO₃ | % K2SO4[2] | Deg F. | K₂O[3] | SO₄ | NO₃*[4] | H₂O*[5] |
| 9113 | | | | 80 | 50 | 5.17 | 4.02 | 1.6 | 90.1 |
| 9123 | | | | 95 | 50 | 4.57 | 4.40 | 0.3 | 91.5 |

*Calculated
[1]Weights are in grams
[2]Weight percent of K₂SO₄ in the solids used (K₂SO₄ + KNO₃)
[3]K₂O is a calculated value determined by the equation K₂O = (% K) × (1.2046)
[4]The NO₃ content was calculated from the molecular balance after analyzing for the other ions.
[5]The water weight percent was calculated as the difference between 100% and the sum of the ions in weight percent The highest $K_2O$ value attainable using the method of this example was 12.36 (20 wt % $K_2SO_4$, 73° F.), which is still substantially less than that attainable using the method taught by the instant invention (i.e., $[K_2O]=15.02$, see Example 1 and Table 1).

Figure 2:
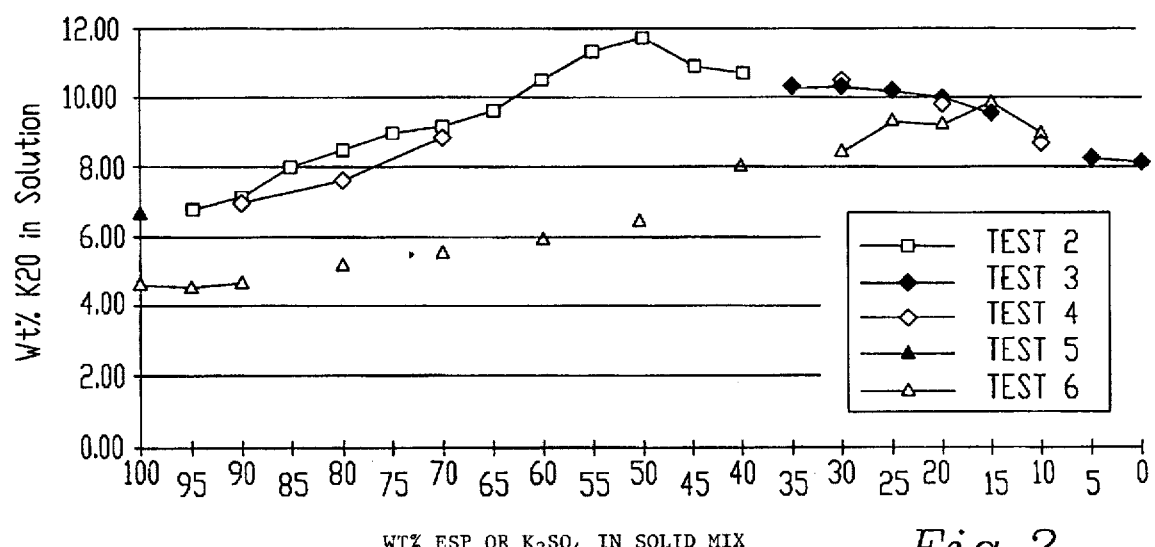
FIG. 2 is a graphical representation illustrating comparative tests with $KNO_3$ and $K_2SO_4$ at a temperature of about 50° F., and showing the effect of formulating a solution with $KNO_3$ and $K_2SO_4$ treated with surfactant, followed by heating.

FIG. 1 illustrates in graphical form the effect of using the various compositions of Examples 1 through 4, the data presented corresponding to temperatures in the range of 71°–74° F. FIG. 1 also includes published solubility data for $K_2SO_4$/$KNO_3$ water systems as contained in Linke, *Solubilities, Inorganic and Metal-Organic Compounds*, American Chemical Society (4th Ed., 1965). Likewise, FIG. 2 illustrates in graphical form the effect of using the various compositions of Examples 1 through 4 at the lower temperature of about 50° F.

Figure 3:
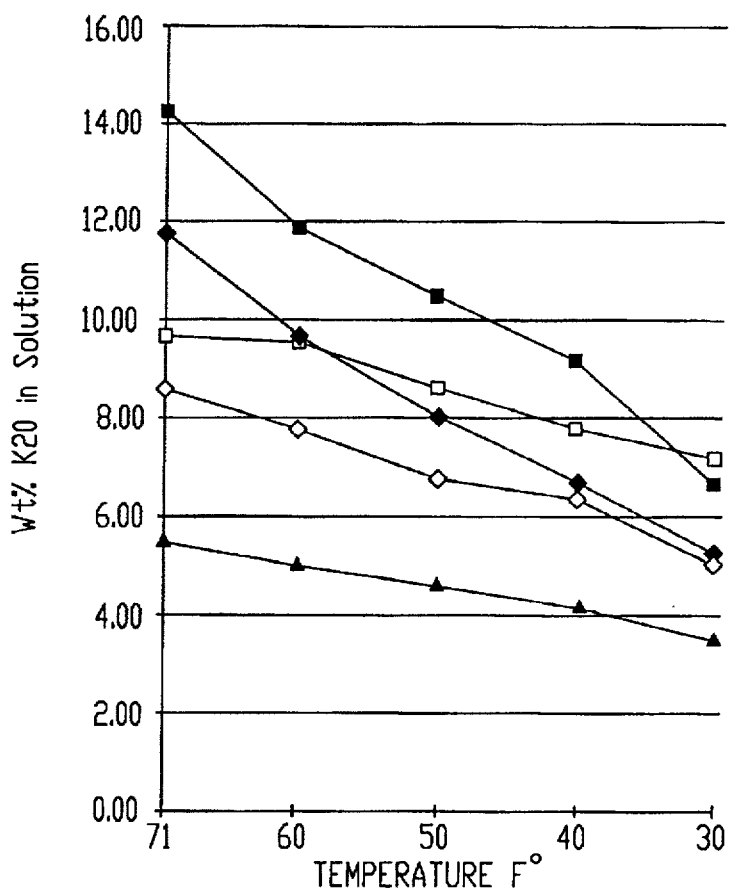
FIG. 3 is a graphical representation illustrating comparative tests with $KNO_3$ and $K_2SO_4$ at different temperatures.

FIG. 3 is a graphical illustration of the data presented in Table 2, showing the effect upon the various solutions by lowering temperature.

I claim:

1. A potassium sulfate/potassium nitrate salt product having enhanced water solubility and comprising dry potassium nitrate salt and dry potassium sulfate salt and a surfactant for increasing the solubility of the potassium sulfate/potassium nitrate product in water, said surfactant being present at a level of at least about 0.1 wt %, based upon the weight of said dry potassium sulfate salt, said surfactant being selected from the group consisting of disulfonate and oxyalkylated alcohol-carboxylic acid adduct surfactants, said product containing 30–70 weight percent of the potassium sulfate.

2. The product of claim 1, said surfactant being present at a level of from about 0.30–0.50 wt %.

3. The product of claim 1, said surfactant comprising a surfactant selected from the group consisting of the alkyl diphenyl ether disulfonates.

4. The product of claim 3, wherein the alkyl group of said disulfonate contains from about 8–22 carbon atoms.

5. The product of claim 4, wherein said alkyl group contains from about 10–18 carbon atoms.

6. The product of claim 4, wherein the alkyl group of said disulfonate is linear.

7. The product of claim 1, said oxyalkylated alcohol-carboxylic acid adduct surfactant being selected from the group consisting of surfactants having the general formula

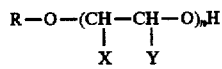

wherein R is a $C_8$–$C_{22}$ hydrophobe, X and Y are individually selected from the group consisting of H, $CH_3$ and a succinic acid radical, and n ranges from about 1–8.

8. The product of claim 1, further including an amount of $MgSO_4$.

9. An aqueous potassium sulfate/potassium nitrate salt solution comprising water, potassium sulfate salt, potassium nitrate salt and a surfactant for increasing the solubility of potassium, said surfactant being present at a level of at least about 0.1 wt %, based upon the weight of said potassium sulfate, said surfactant being selected from the group consisting of disulfonate and oxyalkylated alcohol-carboxylic acid adduct surfactants, said solution containing 30–70 weight percent of the potassium sulfate salt, based upon the dry weight of the salts.

10. The product of claim 9, said surfactant being present at a level of from about 0.3–0.5 wt %.

11. The product of claim 8, said surfactant comprising a surfactant selected from the group consisting of the alkyl diphenyl ether disulfonates.

12. The product of claim 11, wherein the alkyl group of said disulfonate contains from about 8–22 carbon atoms.

13. The product of claim 12, wherein said alkyl group contains from about 10–18 carbon atoms.

14. The product of claim 11, wherein the alkyl group of said disulfonate is linear.

15. The product of claim 9, said oxyalkylated alcohol-carboxylic acid adduct surfactant being selected from the group consisting of surfactants having the general formula

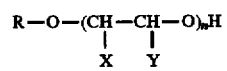

wherein R is a $C_8$–$C_{22}$ hydrophobe, X and Y are individually selected from the group consisting of H, $CH_3$ and a succinic acid radical, and n ranges from about 1–8.

16. The product of claim 9, further including an amount of $MgSO_4$.

17. A method of increasing the solubility of potassium in water, comprising the steps of heating a mixture including water, quantities of potassium nitrate salt and potassium sulfate salt, at least about 0.1 wt % surfactant, based upon the weight of said potassium sulfate salt, to a temperature of from about 100°–210° F. for increasing the solubility of potassium in said water, said surfactant being selected from the group consisting of disulfonate and oxyalkylated alcohol-carboxylic acid adduct surfactants, said mixture containing 30–70 weight percent of the potassium sulfate salt, based upon the dry weight of the salts.

18. The method of claim 17, including the step of heating said mixture with agitation.

19. The method of claim 17, including the step of cooling said mixture after said heating thereof to approximately ambient temperature.

20. The method of claim 19, said surfactant being present at a level of from about 0.30–0.50 wt %.

21. The method of claim 17, said surfactant comprising a surfactant selected from the group consisting of the alkyl diphenyl ether disulfonates.

22. The method of claim 21, wherein the alkyl group of said disulfonate contains from about 8–22 carbon atoms.

23. The method of claim 22, wherein said alkyl group contains from about 10–18 carbon atoms.

24. The method of claim 22, wherein the alkyl group of said disulfonate is linear.

25. The method of claim 17, including the step of first mixing together said water, potassium sulfate, and surfactant, and thereafter heating said mixture.

26. The method of claim 17, said oxyalkylated alcohol-carboxylic acid adduct surfactant being selected from the group consisting of surfactants having the general formula

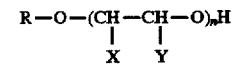

wherein R is a $C_8$–$C_{22}$ hydrophobe, X and Y are individually selected from the group consisting of H, $CH_3$ and a succinic acid radical, and n ranges from about 1–8.

27. The method of claim 17, further including an amount of $MgSO_4$.